April 19, 1960   J. J. STETINA   2,932,854
SPIDER FOR HOLDING CASTING MOLDS
Filed May 19, 1958

INVENTOR.
JOSEPH J. STETINA
BY
D. Gordon Angus
ATTORNEY

United States Patent Office 2,932,854
Patented Apr. 19, 1960

2,932,854

SPIDER FOR HOLDING CASTING MOLDS

Joseph J. Stetina, Downey, Calif., assignor to Tri-Angle Tool & Machine Works, Inc., Los Nietos, Calif., a corporation of California Application May 19, 1958, Serial No. 736,261

6 Claims. (Cl. 18—43)

This invention relates to the casting of hollow articles and to means for supporting and handling the molds used in such a process.

A casting process which is gaining increasing acceptance utilizes a split mold into which a quantity of plastic in the liquid state, such as plastisol, is placed. After the desired quantity of plastic is placed in the mold, the mold is closed and it is thereafter heated while being rotated around a plurality of axes. The rotation causes the plastic to flow over the entire inside surface of the mold so as to cover the same. The heat jells the plastic in place, and after the plastic jells, the molds are quench-cooled, whereby the plastic is set and forms a hollow product whose outer surface corresponds to the inner surface of the mold. The mold is then opened and the hollow article is stripped out. This process is particularly useful for making articles such as toys, balls and the like.

The machinery required for this process is very large and expensive, and in order to carry it out economically, it is necessary to simultaneously process a large number of molds. For this purpose, it is customary to utilize a pair of spiders which are hinged together, each spider bearing one portion of a large number of molds so that when the spiders are brought toward each other, the molds are closed and can be handled as a unit.

Considerable difficulty has been encountered in the use of presently-known spiders. In order to hold the mold parts clamped together, relatively tight clamping pressures are required, which unless carefully controlled, can result in distortion of the molds or spiders. In addition, the spiders undergo considerable temperature change, from elevated temperatures to a quick quench, for example, and this has caused considerable warpage. When the spiders warp, they permit some of the molds to part and to leak. Such leakage is doubly disadvantageous in that not only is the leaking mold rendered useless in that it does not produce an article, but the plastic that is in the mold spills over the rest of the machinery and has to be stripped off, in the meantime causing a fire hazard. When a mold parts only slightly, then a flash is formed on the surface of the article, which must be removed mechanically, thereby adding to the cost of the finished article.

Accordingly, one feature of this invention is to provide a spider for supporting the molds under conditions of varying temperatures and mechanical forces which does not warp substantially.

This invention is carried out by providing a pair of spiders to each of which one part of each mold is attached, and joining the pair of spiders by a hinge. Hold-down means are provided for clamping the spiders toward each other to close the molds.

A feature of this invention resides in a spider confiuration which includes a peripheral outer rim, said peripheral outer rim having integral therewith a plurality of intersecting chord-like ribs, said ribs being provided in families of a plurality of parallel ribs, at least two of said families being disposed at an angle to each other.

The above and other features of this invention will be fully understood from the following detailed description and the accompanying drawings, of which:

Figure 1:
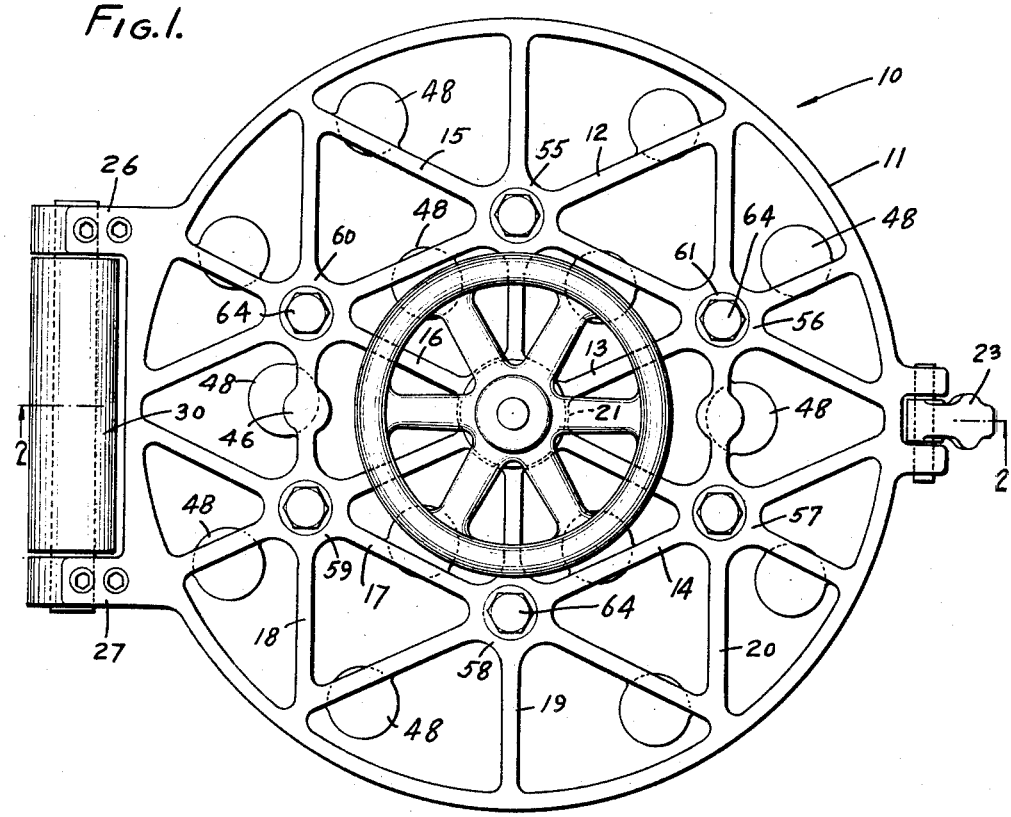
Fig. 1 is a plan view of a spider according to the invention.

In Fig. 1, there is shown a spider 10 according to the invention. The spider includes an outer circular peripheral ring 11 having integral therewith a number of transverse chord-like ribs. It is to be understood that the term "peripheral ring" is not limited to a circular ring, but encompasses any continuous structure which surrounds said chord-like ribs.

Ribs 12, 13 and 14 are parallel to each other, chord 13 being diametrical and ribs 12 and 14 being on opposite sides of rib 13. Ribs 12, 13 and 14 form a first family of parallel ribs. Ribs 15, 16 and 17 are transverse and chord-like ribs. Rib 16 is diametrical, and ribs 15 and 17 are on opposite sides of rib 16. Ribs 15, 16 and 17 form a second family of parallel ribs.

Ribs 18, 19 and 20 form a third family of parallel ribs. Rib 19 is diametrical, and ribs 18 and 20 are on opposite sides of rib 19.

The first, second and third families of ribs are disposed at angles relative to each other, and the acute angle of the intersection between the first and second family is preferably about 50°. A preferred acute angle of intersection between the third family and both the first and second families is about 65°. It is preferable for all ribs to intersect so that their center lines meet to form triple intersections.

Each chord-like rib is integral at each of its ends with the peripheral ring, and is integral with each of the other chord-like ribs which it intersects. A "chord-like rib" is defined as a rib which is connected to the peripheral ring at both ends of the rib, and includes a diametrical rib.

A "family" of chord-like ribs is defined as at least two parallel-spaced apart chord-like ribs. Thus, ribs 15, 16 and 17 are all chord-like ribs, and any two, or all three of them, comprise a single family.

Figure 2:
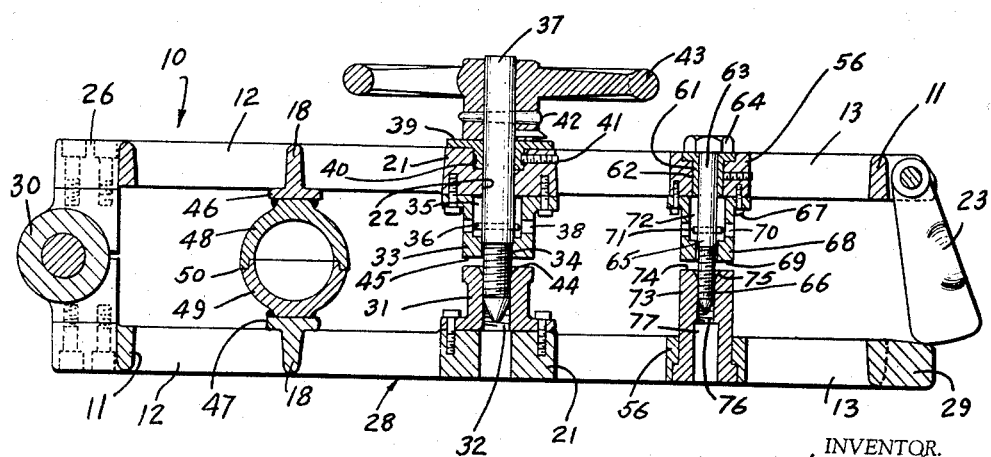
Fig. 2 is a cross-section taken at line 2—2 of Fig. 1.

At the center intersection of ribs 13, 16 and 19, there is an enlarged boss 21 through which there is drilled a bore 22 (see Fig. 2). Referring again to Fig. 1, at the right hand side of the peripheral ring 11, there is a hinged striker plate 23 which acts as a jack. At the left hand edge of the peripheral ring, there are two lugs 26, 27.

A second spider 28 is provided which has a peripheral rim, ribs and central boss identical with those of spider 10, and like numerals are applied to corresponding elements. At the right hand side of spider 28 (see Fig. 2) there is a flange 29 against which the striker plate can bear.

A hinge 30 is attached to lugs 26 and 27 of spiders 10 and 28 so that the spiders can be opened in a jaw-like manner.

In order to hold the spiders toward each other, hold-together means are provided which are best shown in Fig. 2. To the central boss 21 of spider 28, there is bolted a sleeve 31. This sleeve has a central threaded bore 32. To the underside of the central boss 21 of spider 10 there is bolted a sleeve 33. Sleeve 33 has a bore 34 at its lower end and a counterbore 35 at its upper end. The counterbore is larger than the bore 22 through the central boss and smaller than bore 34. A cross-pin 36 projects from a screw 37 that passes through the sleeve. A cross-bore 38 is drilled through sleeve 33 to permit the cross-pin to be drifted out of the screw 37. It will be observed that with the cross-pin in place, screw 37 can rotate freely, but is limited in axial movement to the distance of permissible travel of the cross-pin in the counterbore. A bushing 39 is held in a seat 40 in the upper surface of the central boss 21 by a set screw 41. A taper pin 42 attaches a hand wheel 43 to the upper end of screw 37.

The upper end surface 44 of sleeve 31 is a flat annulus and the lower end surface 45 of sleeve 33 is also a flat annulus. As best shown in Fig. 2, these annuli are slightly spaced from each other when the spiders are brought toward each other in a normal, closed position of the spider assembly.

A boss 46 is cast integrally with rib 18 of the upper boss 10 and a corresponding boss 47 is cast integrally with the like rib of lower spider 28. To boss 46 there is attached one mold half 48, which it will be understood need not be fifty percent of the mold, but instead is simply a mold portion from which the cast article can be easily stripped. A corresponding mold half 49 is attached to boss 47. The molds preferably join at a step 50 which step prevents side-slipping relative movement of the two mold halves.

It will be understood that the mold consisting of halves 48 and 49 is given as a single example of a suitable mold. As many molds as desired may be used, simply by attaching them to the spiders. The shape of the object to be molded is of no consequence to the spiders.

According to a preferred arrangement, the flat annuli 44, 45 on the hold-down means are slightly spaced by a distance of the order of 0.010" when the mold is tightly closed.

Sometimes it may be desirable to provide different types of means for holding the spiders together. This is particularly true when the molds are grouped in clusters around the spider. Then hold-together forces exerted near or even in the middle of such clusters have a greater effect in holding the individual molds closed than a clamping action exerted at a single center point on the structure.

As an example of a technique for providing such additional hold-down means, there are shown in Fig. 1 six additional bosses 55—60 which are provided on both the upper and the lower spiders. A single example is shown in detail in Fig. 2, this being the apparatus associated with boss 56. This construction is essentially similar to that used at the center, there being pressed into the top of the boss 56 in the upper spider, a bushing 61, this bushing being held in place by a screw. The bushing is pressed into a bore 62 in the boss 56 and receives a screw 63. The screw has a hexagonal head 64 so that it can be tightened by a wrench and it also has an elongated shank 65 which terminates at a threaded portion 66.

To the bottom of boss 56, there is attached by screws 67 a sleeve 68 which terminates at a flat annular end surface 69. A cross bore 70 is drilled through the sleeve to pass a cross pin 71 which allows the screw 63 to rotate in the sleeve, and to move up and down a limited distance in a counterbore 72 within the sleeve 68.

A second sleeve 73 is pressed through an opening in a corresponding boss 56 in the lower spider and projects upwardly where it terminates at a flat annular end surface 74. Adjacent the end surface 74 there is a chamfer 75 which intersects internal threads 76. These internal threads are adapted to receive the thread 66 on the end of screw 63. Below the internal thread 76 there is a bore 77 which extends the rest of the distance through the sleeve, thereby providing means for draining the lower sleeve. The end surfaces 69 and 74 are spaced apart approximately the same distance as the like surfaces 44 and 45 in the central hold-down means, and all of the flat annular surfaces are preferably disposed at an elevation which is approximately level with the parting lines of the molds. The operation of the hold-together means associated with the bosses 55—60 are evident from the drawings. It will be understood that these hold-together means can be used either in place of, or in addition to, the hold-together means shown at the center of the structure.

The use of these spiders will now be described. When the molds are first to be used, the hand wheel 43 is spun backwards so as to release the hold-down means by withdrawing the screw 37 from the threaded bore 32. Then jack 23 may be operated by striking the striker plate, thereby forcing the mold halves apart. The upper spider is pulled away from the lower spider, the spiders parting in a jaw-like motion around hinge 30.

A predetermined quantity of plastisol or other liquid plastic material is placed in each of the molds, and the spiders are again brought toward each other so as to close the molds. The hand wheel is spun so as to thread the screw into the threaded bore 32. When the position shown in Fig. 2 is reached, it is preferable for the hand wheel not to be tightened further, because the molds are already closed. However, if the hand wheel is turned to cause additional tightening, then after only a very small deflection, the annuli 44 and 45 will abut and regardless of any additional torque on the hand wheel, no further distortion of the spider or of the molds will occur. This hold-together means is therefore self-limiting with respect to potential distortion of the spiders or the molds. The basic separation of the annuli in the closed position may of course vary with different set-ups, the spacing of 0.010" being found most desirable for a cast iron spider of 24" diameter.

After the molds are filled, the spider assembly is conveyed to the casting machine where it is picked up and rotated around a plurality of axes. During the following period, when the whole assembly is subject to a wide temperature range, a sharp thermal shock, and strong clamping pressures, there is little, if any, distortion of the spiders. It appears that the reason for this absence of distortion resides in the lattice-like construction as shown. The intersecting ribs form a strong bracing system of intersecting transverse beams which is braced in all directions, and which deflects hardly at all with changes in temperature or clamping forces. Such spiders have been used through many heating cycles and no distortion has been observed either of a temporary or of a permanent nature, regardless of the material used, and it has been found that inexpensive cast iron is satisfactory for this spider.

Previously known spiders have in very short time warped as much as ½" from a flat plane over a 24" diameter which has rendered the spider useless. In an attempt to overcome this tendency, expensive and hard to handle aluminum alloys have been used but even these have proved inadequate to cure the basic disadvantages of previously known spiders. The instant invention avoids these disadvantages by providing a structure which is inherently free of such distortion.

After the casting cycle is completed, the hand wheel is spun back so as to release the hold-down means, the jack is struck so as to split the molds and the completed products are stripped from the molds. The assembly is then ready for the casting operation.

This invention is not to be limited by the embodiments shown in the drawings and described in the description, which are given by way of example and not of limitation, but only in accordance with the scope of the appended claims.

I claim:

1. A clamp for holding closed a plurality of molds made up of separable mold halves comprising a pair of spiders to which said mold halves are mounted, said spiders being joined by a hinge at an edge thereof, each of said spiders comprising a continuous peripheral ring and three mutually intersecting families of ribs, each family of ribs including a plurality of symmetrically spaced chord-like ribs, one of which is diametrical, two of said three rib families being disposed at an angle to each other and at equal angles to the third family to form a substantially uniform lattice characterized by multi-dimensional symmetry and including three mutually intersecting families of parallel zones of contiguous triangular polygons, each rib of each family being integral with the ribs of other families that it intersects and having its ends integral with the peripheral ring, and said diametrical ribs intersecting each other at the center of the ring to form in each spider a central boss, each of said central bosses having associated therewith means for holding said spiders relative to each other.

2. Appartus according to claim 1 in which the spider bears a plurality of bosses on the ribs, which bosses are spaced from the center of the ring, means on opposed ones of said bosses for receiving a screw, and means on opposed bosses for passing said screw, and a screw on each of said last named means adapted to be threaded into the first named means, for drawing the spiders toward each other.

3. Apparatus according to claim 1 in which said means for holding the spiders relative to each other comprise a screw receptacle on the central boss of one of said spiders and a screw mounted to the central boss at the other of said spiders, said screw being adapted to enter and engage in said receptacle and draw the spiders toward each other.

4. Apparatus according to claim 3 in which a screw retainer is attached to the spider which bears the screw, the screw passing through said retainer, said retainer and said screw receptacle each having a flat annulus on the end thereof, said retainer and receptacle being of such length that the annuli can be drawn into abutment to limit the distance by which the spiders can be drawn toward each other.

5. Apparatus according to claim 4 in which a plurality of mold halves are mounted to each of said spiders, said mold halves being opposed in pairs so that each pair encloses a molding cavity, a step on each of said mold halves for receiving and aligning its mating mold half, said steps abutting each other before the annuli abut each other.

6. Apparatus according to claim 1 in which abutment means are provided for each of said bosses, said abutment means being spaced apart when the mold halves are just joined, and adapted to be drawn into contact with each other upon further tightening down on the means for holding said spiders relative to each other, said abutment means preventing further approach of the spiders toward each other after they have abutted.

References Cited in the file of this patent

Modern Plastics, "Rotational Molding of Plastisols," by S. Zweig, September 1955, 5 pages. (Copy can be found in Division 15.)

Modern Plastics, "More Bounce in Vinyl Balls," September 1954, 4 pages. (Copy can be found in Division 15.)

UNITED STATES PATENT OFFICE
CERTIFICATION OF CORRECTION

Patent No. 2,932,854                                April 19, 1960

Joseph J. Stetina

It is hereby certified that error appears in the above numbered patent requiring correction and that the said Letters Patent should read as corrected below.

Column 5, line 26, for "at" read -- of --.

Signed and sealed this 9th day of May 1961.

(SEAL)
Attest:

ERNEST W. SWIDER
Attesting Officer

DAVID L. LADD
Commissioner of Patents